(12) United States Patent
Hermey et al.

(10) Patent No.: US 11,378,161 B2
(45) Date of Patent: Jul. 5, 2022

(54) MONITORING SYSTEM FOR OPERATING AN ENERGY CHAIN

(71) Applicant: igus GmbH, Cologne (DE)

(72) Inventors: Andreas Hermey, Hennef (DE);
Thilo-Alexander Jaeker, Sankt Augustin (DE); Dominik Barten, Meckenheim (DE); Konstantin Schmer, Cologne (DE)

(73) Assignee: IGUS GMBH, Cologne (DE)

( * ) Notice: Subject to any disclaimer, the term of this patent is extended or adjusted under 35 U.S.C. 154(b) by 202 days.

(21) Appl. No.: 16/472,602

(22) PCT Filed: Dec. 22, 2017

(86) PCT No.: PCT/EP2017/084403
§ 371 (c)(1),
(2) Date: Jul. 23, 2019

(87) PCT Pub. No.: WO2018/115449
PCT Pub. Date: Jun. 28, 2018

(65) Prior Publication Data
US 2020/0386296 A1     Dec. 10, 2020

(30) Foreign Application Priority Data
Dec. 23, 2016 (DE) .......................... 202016107316.2

(51) Int. Cl.
*G01N 3/08* (2006.01)
*F16G 13/18* (2006.01)
*G01B 11/14* (2006.01)

(52) U.S. Cl.
CPC .............. *F16G 13/18* (2013.01); *G01B 11/14* (2013.01); *G01N 3/08* (2013.01)

(58) Field of Classification Search
None
See application file for complete search history.

(56) References Cited

U.S. PATENT DOCUMENTS 4,372,172 A    2/1983   Gombocz et al.
7,936,450 B2   5/2011   Hoersch et al.
(Continued)

FOREIGN PATENT DOCUMENTS

DE     720356     5/1942
DE    3005780     2/1981
(Continued)

OTHER PUBLICATIONS

Search report from corresponding German Appln. No. 20 2016 107 316.2, dated Aug. 3, 2017.
(Continued)

*Primary Examiner* — Lisa M Caputo
*Assistant Examiner* — Nigel H Plumb
(74) *Attorney, Agent, or Firm* — Grossman, Tucker, Perreault & Pfleger, PLLC (57) ABSTRACT

A monitoring system for the operation of an energy chain. This has a movable strand, a stationary strand and a deflection bend therebetween. The system comprises at least one sensor which generates at least one output dependent on the condition of the energy chain, and an evaluation unit which evaluates the at least one output of the sensor in order to monitor whether a fault condition occurs during operation of the energy chain. The sensor has a non-contact working principle and is arranged so that the sensor interacts from a distance with at least a subregion of the deflection bend and/or a subregion of the movable strand. The sensor thus generates an output which is dependent on the position and/or speed of the energy chain.

19 Claims, 3 Drawing Sheets

(56) References Cited

U.S. PATENT DOCUMENTS

| | | |
|---|---|---|
| 8,550,236 B2 | 10/2013 | Merten et al. |
| 9,193,534 B2 | 11/2015 | Gehring et al. |
| 10,175,124 B2 | 1/2019 | Hermey et al. |
| 2015/0122047 A1 | 5/2015 | Riddall |

FOREIGN PATENT DOCUMENTS

| | | |
|---|---|---|
| DE | 202004005858 | 6/2004 |
| DE | 102004049482 | 4/2006 |
| DE | 102006041307 | 3/2008 |
| DE | 102007043043 | 3/2009 |
| EP | 2189820 | 5/2010 |
| EP | 2235396 | 6/2013 |
| EP | 2693362 | 2/2014 |
| WO | 2004/090375 | 10/2004 |
| WO | 2009/095470 | 8/2009 |
| WO | 2013/156607 | 10/2013 |

OTHER PUBLICATIONS

English translation of International Search Report from corresponding PCT Appln No. PCT/EP2017/084403, dated Apr. 25, 2018.
English translation of International Preliminary Report on Patentability from corresponding PCT Appln No. PCT/EP2017/084403, dated Jul. 4, 2019.

MONITORING SYSTEM FOR OPERATING AN ENERGY CHAIN

FIELD

The invention generally relates to the monitoring of the operation of at least one energy chain or similar active or dynamic line guiding device.

BACKGROUND

Energy chains are used for guiding at least one supply line between a base or a fixed point and an entrainment member relatively movable thereto. They typically form a moveable strand, a stationary strand and, in between, a deflection bend, wherein the deflection bend moves at half the speed of the entrainment member. Typically, the energy chain guides several supply lines, such as cables for electrical power and/or signal supply and hoses for the supply of liquid or gaseous resources.

In normal operation or during intended operation of the energy chain, the moveable strand is pulled or pushed by the entrainment member in the direction of travel. Due to friction and inertia, the chain causes a force opposing the movement and, dependent on the length and weight, is partly exposed to considerable tensile or compressive forces. Fault conditions can arise during operation, especially due to compressive forces, especially in energy chains having high speeds and/or long travel paths. The normal operation of the energy chain can be disturbed due to wear, but also due to an external fault or defect, for example, a control error that leads to exceeding the maximum travel path, or an interfering object or obstacle. In such cases, it can lead to fault conditions of the chain, such as to a breaking out of the movable strand in the thrust direction before the deflection bend, such as a bend course deviating from proper course, to escaping from a guide, up to breaking the chain.

In this context, the invention relates, in particular, to a monitoring system for the early detection of such fault conditions, wherein the system is equipped with at least one sensor generating at least one output dependent on the condition of the energy chain, and an evaluation unit. The evaluation unit evaluates the output of the sensor to monitor whether a critical condition occurs during operation of the energy chain, in particular before the energy chain is damaged with the lines guided therein.

Such a system is already known from WO 2004/090375 A1 and has been successfully introduced to the market by the applicant. In this case, one or more sensors configured as a force sensor detects which forces act on the energy chain. The evaluation unit compares the detected forces with a predetermined, taught tolerance range to detect whether a malfunction occurs. A further development of the force sensor is proposed in WO 2013/156607 A1.

WO 2009/095470 A1 or EP 2 235 396 A1 likewise discloses a force measurement for the purpose of safety shutdown. The energy chain is disconnected from the supplied system, machine or the like depending on forces acting.

These previously known approaches monitor whether inadmissibly high forces occur in order to possibly intervene against damage, in particular against breakage, of the energy chain. Many breakdowns can be detected early based on a force measurement.

WO 2009/095470 A1 (see page 11) further proposes to provide a number of contact elements along the travel path which contact elements can come into contact with the energy chain. These contact elements generate a signal the evaluation of which can cause a change of operation, in particular the aforementioned disconnection of the energy chain from the machine.

A further approach, which is not based on force measurement, has been proposed by the applicant in the utility model DE 20 2004 005 858 U1. Here, with a selection of the chain links of the energy chain, a switch-type sensor is arranged respectively on or in the chain link, with the pivoting of the chain link over a certain angular range further being able to be registered. For this purpose, for example, a gravity switch designed as a mercury switch can be provided, which detects the spatial orientation of the respective chain link. On the basis of a plurality of such sensors in the energy chain, the current position can be monitored, for example, as to whether the deflection bend shows a nominal course. Although this solution allows early detection, it is complex, since a number of additional devices is to be installed on or in the energy chain and is thus associated with considerable cabling effort.

There are also further known generic systems that only recognize a chain fracture that has already occurred. However, this does not allow early detection, for example, for preventive maintenance, and does not avoid unwanted failure.

SUMMARY

A first object of the present invention is therefore to propose a simple yet robust solution for monitoring the operation of an energy chain, which is in particular associated with less manufacturing effort and allows early detection of fault conditions.

The energy chain is generally an active, dynamic line guiding device for guiding at least one line between a first connection point of the energy chain to a base and a relatively movable thereto second connection point of the energy chain on an entrainment member. Typically, the base is stationary, and the entrainment member is relatively movable, for example, arranged on a moving part of a machine or system to be supplied. The energy chain comprises, in a manner known per se, a moveable strand, a stationary strand and a deflection bend connecting both strands between the two. Typically, the movement of the energy chain runs in one plane. Within the scope of the invention, however, there are also courses with lateral movement or three-dimensional movement, for example, in robots.

The generic monitoring system comprises an arbitrary energy chain and at least one sensor which generates at least one output dependent on the condition of the energy chain. The output can be carried out in particular continuously or at short time intervals. Furthermore, the generic system evaluates the at least one output of the sensor, preferably based on a separate evaluation unit. In this context, the term "output" is generally to be understood here as meaning information. It is typically transmitted by one or more electrical signals, digital or analog, to be evaluated. An evaluation unit spatially integrated in or on the sensor is within the scope of the invention.

The evaluation compares preferably continuously or at high frequency the condition value generated at the outlet of the sensor as an output having a predetermined tolerance range or tolerance field in order to detect at an early stage whether a fault condition, for example, undesired position or incorrect course, occurs during operation of the energy chain. If a discrepancy is determined to be critical, the evaluation unit can output a signal for stopping the moving machine part with which the entrainment member is connected in order to prevent a breaking of the energy chain. The tolerance range can be based on target or comparison values which are predetermined in a teach mode of the evaluation unit. This is done, for example, by the normal operation being passed through step by step and the evaluation unit recording the operating parameters necessary for the evaluation as normals or reference values.

According to the invention, the object is achieved in that the sensor operates without contact, that is, designed as a non-contact detecting sensor. The sensor can thereby detect a relevant condition variable of the energy chain without mechanical contact, that is, without mechanical action of the energy chain on the sensitive or detecting components of the sensor. A non-contact principle of operation of the sensor enables a distance being present between the sensor and the region of the energy chain, the condition variable of which is detected. In particular, the sensor can detect a relevant condition variable from outside in relation to the energy chain.

In particular, the sensor can function dependent on the position of the energy chain in general, its exact position or its kinematic behavior, in particular the speed, or can function sensitively in this respect. In particular, the position and/or the speed of a subregion of the energy chain is considered a relevant condition variable. The subregion can vary in time with respect to the energy chain, such as a longitudinal section passing through a determined spatial region, for example, the entrainment member, the deflection bend, a region between the deflection bend and entrainment member, etc. Thus, it does not have to be an unchanging longitudinal section of the energy chain. It is also possible to consider a dynamically varying subregion of the chain, for example, the deflection bend or a subregion, which passes through a predetermined spatially fixed zone in the installation space required for movement.

According to the invention, the sensor thus generally interacts with the energy chain from a distance. For this purpose, the sensor can be arranged, in particular relative to the energy chain, so that it interacts from a distance with at least one corresponding subregion, in particular the deflection bend and/or the movable strand. Thus, the sensor according to the invention can output without contact a value dependent on the dynamic behavior of the energy chain, in particular dependent on the instantaneous position and/or the instantaneous speed of the interacting region. The output at the sensor output can be dependent on a time-variable distance between the sensor and the interacting region of the energy chain. The region can comprise a partial longitudinal section of the energy chain or can comprise essentially the entire chain. In particular, the time-variable deflection bend and/or a longitudinal section which connects directly to the entrainment member, possibly up to the deflection bend, can interact with the sensor.

Particularly suitable are non-contact sensors, which function sensitive to position in relation to the interacting subregion of the energy chain, that is, in the manner of distance measuring devices, or directly sensitive to speed, that is, as speed measuring devices (without statement about the absolute position).

The monitoring system according to the invention offers a multitude of implementation possibilities and a number of advantages compared to known monitoring systems. On the one hand, the system is particularly robust, that is, less susceptible to faults, since the detection system itself does not have to include any moving parts because of its non-contact detection—with the exception of the energy chain. Furthermore, the system enables the use of a single sensor or only a few, for example, up to four redundant sensors, and is therefore cost-effective.

The sensor can be particularly preferably arranged outside the chain or externally. Externally arranged means, above all, that the sensor does not have to be arranged in or on relatively movable chain links and not in the force-transmitting part of the energy chain, as otherwise required with the previous systems. However, the sensor can also be attached on the entrainment member or on the end fastening member of the chain fixedly connected to the entrainment member, that is, preferably not on one of the mutually relatively movable chain links. Thus, no or at most a slight change in the energy chain is required, whereby production, installation and maintenance of the monitoring system, but also the monitored energy chain, are easy.

One or more non-contact sensors can thus be arranged spatially separate from susceptible sections of the energy chain, instead of directly on or in the longitudinal sections or chain links which are potentially prone to fault conditions, and nevertheless monitor the critical regions. As a result, the sensors themselves are inherently protected against the effects of fault conditions.

Preferably, the sensor is spatially oriented or arranged so that its detection area is aligned essentially in the longitudinal direction or parallel to the travel path of the energy chain. As a result, at least a predominant part of the travel path of the energy chain can be monitored with only one or at least only a few sensors. Thus, for example, the optical beam path of a laser distance measuring device, a light barrier or the like lies in the vertical center plane of the energy chain. For example, the main axis or central symmetry plane of the field of view of a camera or a scanner or the like can be set accordingly parallel to the movement plane, etc. The orientation can thereby be set approximately centrally on the width of the energy chain, or even on the plane of the side flaps of one or both link bands, dependent on whether, for example, cross bars are to be counted like an incremental counter, or a more precise distance, for example, to the deflection bend, is to be determined.

In one embodiment, one or each sensor is arranged so that the longitudinal section of the chain that currently interacts with the sensor as a subregion depends on the current position of the energy chain. In other words, the same sensor operates with a spatially fixed detection area in which a subregion of the deflection bend and/or the movable strand varies in time, dependent on the position of the energy chain.

The interaction of the sensor with the subregion can consist, in particular, in the fault condition and/or in normal operation. For this purpose, the sensor is preferably aligned to a spatially fixed region, in which longitudinal sections of the energy chain pass through one after the other, variable in time and dependent on the instantaneous position.

In one variant, the sensor interacts with at least one subregion both in the fault condition and in the normal condition of the chain. In another variant, the sensor interacts with a subregion of the chain only in the fault condition. Finally, the sensor can interact with at least a subregion of the chain only in normal operation. An advantage of the first and last variant is that a longer absence of the expected output signals a malfunction of the sensor, which offers a better detection security and a technically particularly robust and reliable solution with regard to the signal. In one variant, essentially, the entire vulnerable region of the chain is detected by the sensor in each condition of the energy chain, which requires, for example, a sufficiently large field of view with a camera as sensor and requires image processing. An advantage of this embodiment, however, is that virtually all possible deviations from the intended operation of the chain can be detected.

In all embodiments, the sensor is preferably designed as a non-mechanically detecting sensor, in particular as an optically detecting sensor. The non-contact function of the sensor can be based on light waves in the visible and/or non-visible spectrum, for example, by means of laser distance measurement. Alternatively, other non-mechanical principles are conceivable, for example, based on sound waves, such as ultrasonic distance measurement, but which are less precise and difficult to adjust. Also possible are electrical or magnetic functional principles that detect without contact.

Combined with the core ideas described above, but also independently thereof, a solution having a purely optical detection principle, however, is considered on its own as a particularly preferred, independent invention aspect.

In a technically simple to implement and reliable optical embodiment, the sensor is designed as a distance or speed meter for optical measurement, for example, as a laser distance measuring device. Measurement is understood as the determination of a quantitative statement about a physical variable. However, the sensor does not have to be an actual measuring device, but can be designed, for example, for a discrete yes/no condition detection, for example, a light barrier for monitoring a specific threshold, such as a spatial height.

In a second optical embodiment, the sensor is designed as an imaging sensor for digital image processing, which preferably detects a predominant part or possibly also the entire length of the energy chain. For imaging detection, the sensor can be designed in particular as a so-called vision sensor or as a smart camera for a running video surveillance. This embodiment enables a condition-independent detection of the energy chain, both in normal operation and in the fault condition, and thus greater flexibility in condition discrimination. In addition, several adjacent energy chains can be monitored with the same imaging sensor.

In an embodiment which is advantageous in particular for imaging sensors, a series of optically effective recognition features is provided on the energy chain in the longitudinal direction. These can interact for detection with the sensor from the outside. Suitable recognition features, for example, barcodes, color coding, numbers or other symbols, can significantly simplify the computational processing of the data output of the imaging sensor in the evaluation unit or also in the imaging sensor. In addition, the condition of the energy chain can be determined much more easily based on a sequence of identifiable distinguishing detection features, similar to, for example, an ascending or descending number sequence.

The sensor generates continuously in time or discretely at short time intervals, in particular significantly less than the quotient of division or limb length and maximum speed of the chain, current output values for the detected condition variable and the system evaluates these continuously over time or at least with a correspondingly high frequency. The condition variable generally refers to a variable which describes the condition of the energy chain, in particular the position and/or the speed of at least one monitored subregion of the deflection bend and/or of the movable strand.

In an embodiment which is suitable for the most diverse types of sensors and almost all applications of the energy chain, the sensor detects a condition variable of the deflection bend.

In one embodiment, the sensor is arranged on the entrainment member or on the second connection point, in particular on the end fastening part of the entrainment member-side end of the energy chain. The advantage of this arrangement lies in that the sensor can be manufactured and delivered together with the energy chain and is thus particularly easy to install on site. Nevertheless, the sensor is not arranged on a susceptible region of the energy chain. In addition, when interacting with the deflection bend, a relative measurement or detection can be inherently carried out which does not depend on other parameters of the application, for example, the dimensioning of a guide groove or the like. Particularly in the aforementioned embodiment, the evaluation unit can determine a relative speed or a speed ratio between entrainment member and deflection bend in a particularly simple manner on the basis of the output of the transmitter and compare this value with a predetermined tolerance range. This enables the manufacturer to program the tolerance range, since it does not depend on typical end-use or installation boundary conditions, such as absolute speeds. A deviation from the typical ratio according to which the deflection bend should have half the speed of the entrainment member during movement is a good indicator of a variety of fault conditions, since these occur predominantly in the longitudinal section between the entrainment member and deflection bend.

In another embodiment, the sensor is stationary, that is, arranged stationary and immovable relative to the base in order to detect a condition variable of the movable strand and/or the deflection bend. An advantage of the stationary arrangement of the sensor is that this solution is particularly robust and requires no cabling through the energy chain when the controller is installed stationary. However, it usually has to be installed on site.

For example, the sensor can be arranged stationary above the energy chain, from where it can detect the position of at least a subregion of the movable strand and/or the deflection bend without contact.

In a further stationary variant, the sensor can be arranged opposite to this essentially at the height of the deflection bend, in order to detect the position and/or speed of the deflection bend.

In a technically simple and favorable embodiment, the sensor is designed as a light barrier and is effectively arranged at a predetermined height above the deflection bend in the plane of movement of the energy chain. In this variant, the light barrier only responds to this subregion in the fault condition, namely when the predetermined height is exceeded by at least one subregion of the energy chain. In this embodiment, only the occurrence of a certain fault condition of the chain triggers the light barrier.

In a further embodiment, the sensor is designed as an induction loop and arranged at a predetermined height above the deflection bend, effectively in the plane of movement of the energy chain. Also, in this embodiment, the sensor acts exclusively for a certain fault condition, namely when the predetermined height is exceeded by at least a subregion of the energy chain. When this fault condition of the chain occurs, the ascended subregion of the chain gets into the induction loop and thus triggers an electrical signal change at the sensor output. This embodiment is well suited for energy chains that inherently have ferromagnetic properties, or when at least some chain links are provided with ferromagnetic materials. It is particularly suitable for chains with links made of sheet steel.

In particular, using an imaging non-contact detection principle, a sensor can readily interact with two or more energy chains. This allows a particularly cost-saving monitoring in the operation of several spatially adjacent energy chains.

Depending on the type used, several contactless sensors can interact with an energy chain, for example, for a more precise detection or for particularly long travel paths.

The energy chain preferably comprises a plurality of hingedly connected chain links and, in particular, can be moved back and forth in a plane of movement between two end positions. The energy chain can also be arranged vertically and can be moved back and forth in the vertical direction.

A chain link typically has two side flaps, with wide and narrow surfaces, which are detachably or non-detachably connected by cross bars. In the case of such a link chain, the sensor can interact selectively with predetermined parts of the chain links, for example, with the narrow sides of the side flaps on one side or in particular with the cross bars, preferably on the radially outer side in the deflection bend. The narrow sides of the side flaps form a strip or strand which can be detected virtually continuously in the longitudinal direction, the cross bars typically have a periodic stripe pattern as compared to the chain link of small dimension in the longitudinal direction, as in ladder rungs. Suitable recognition features can thus be provided in particular also at the cross bars or integrated therein.

All embodiments are particularly advantageous for energy chains having sliding or unwinding top strand, in particular for energy chains having an approximately horizontal course which are designed for long travel paths, typically >5 m, in particular >10 m.

The invention furthermore relates, quite independently of the evaluation unit, to an arrangement for a monitoring system comprising an energy chain and at least one contactless sensor according to the invention, which can be designed and/or arranged according to one of the preceding embodiments.

The invention further relates to the use of a monitoring system according to the invention or an arrangement according to the invention for monitoring an energy chain in terms of whether a fault condition, in particular an undesirable course, occurs during operation of the energy chain.

Finally, the invention also relates to the combination of sensor according to the invention and evaluation unit for retrofitting an already installed energy chain or for the initial equipping of existing chain designs (catalog products).

The proposed monitoring system or the proposed arrangement allow, in particular, a sufficiently accurate and continuous position determination of the deflection bend with respect to the travel path for the purpose of monitoring an energy chain. A variety of breakdowns can be easily detected from an unexpected change in position of the deflection bend.

BRIEF DESCRIPTION OF THE DRAWINGS

Further advantageous features and effects of the invention are explained below with reference to some preferred embodiments with reference to the accompanying drawings. Shown are.

DETAILED DESCRIPTION

In all drawings, like reference characters designate features of equivalent nature or effect. For facilitation, some unchanging features of FIG. 1 are not repeated in FIGS. 2-6.

Figure 1:
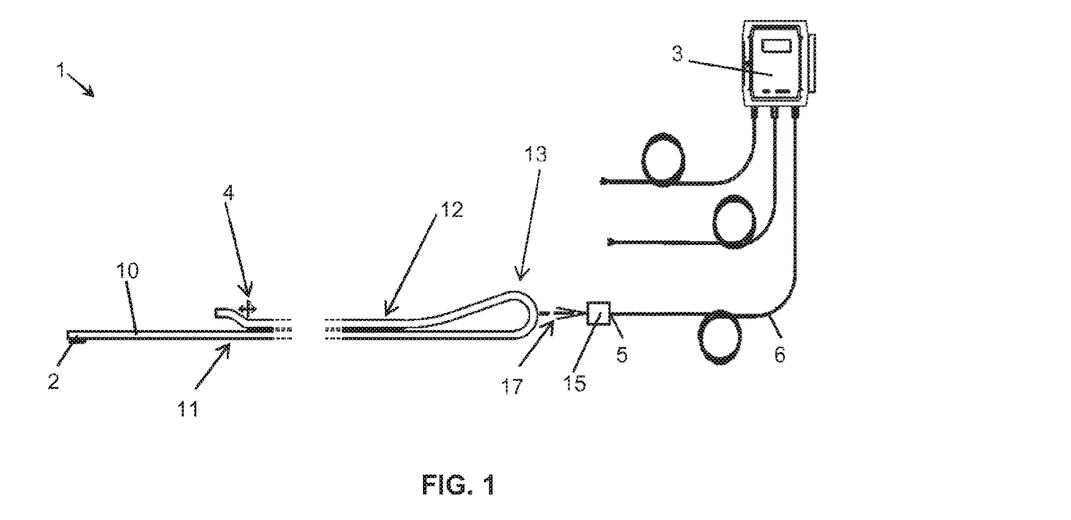
FIG. 1 is a schematic diagram, a first embodiment of the monitoring system according to the invention having an optical sensor and an evaluation unit in a side view.

A monitoring system, generally designated 1, having a sensor 15 and an evaluation unit 3 as essential components is shown schematically in FIG. 1. The monitoring system 1 monitors whether the operation of an energy chain 10 takes place as intended or normally. The energy chain 10 comprises a stationary strand 11, also called a bottom strand in horizontal arrangement, a moveable strand 12, also called a top strand in horizontal arrangement, and a movable, approximately U-shaped deflection bend 13 having a predefined radius of curvature as a variable transition between the two. FIG. 1 shows a so-called "sliding", that is, not self-supporting, energy chain 10, in which the movable strand 12 slides or rolls on the stationary strand 11. In this case, the predefined radius of curvature of the deflection bend 13, for the protection of the guided lines (not shown), is significantly greater than the minimum distance between the strands 11, 12. However, the monitoring system 1 according to FIG. 1 is likewise suitable for self-supporting energy chains (not shown), that is, when the strands 11, 12 are maintained or held parallel to each other with a distance approximately equal to the radius of curvature of the deflection bend 13.

The end region of the stationary strand 11 forms a first connection point of the energy chain 10 and is fastened to a base spatially fixed to the environment, which base forms the fixed point 2 of the energy chain 10. The end region of the movable strand 12 forms a second connection point of the energy chain 10 and is fixed to an entrainment member 4 which is movable relative to the fixed point 2, namely connected to the moving part to be supplied, for example, from an industrial machine or system.

In a manner known per se, the entrainment member 4 moves in a forward and backward direction in accordance with the double arrows drawn in FIGS. 1-6, thereby pulling or pushing the energy chain 10. In FIGS. 1-6, the entrainment member 4 and thus the position of the energy chain 10 are shown purely by way of example only for illustration in the form of a snapshot as an instantaneous intermediate position. The energy chain 10 shown in FIGS. 1-6 is thus designed for a planar movement along the forward and backward direction, that is, with strands 11, 12 remaining parallel and essentially consists of chain links (not shown in more detail) which are pivotable parallel pivot axes angled against each other perpendicular to the plane of FIGS. 1-6. The energy chain 10 can furthermore be guided laterally in a device (not shown in greater detail) in FIGS. 1-6, for example, in a suitable guide channel.

In the embodiment according to FIG. 1, a single external sensor 15 interacts with the deflection bend 13 without contact, from a distance. In FIG. 1, among other things, this variable distance of the sensor 15 from the deflection bend 13 is not shown to scale for the sake of simplicity. The sensor 15 in FIG. 1 is an optically active sensor, for example, a laser distance measuring device. The sensor 15 is arranged stationary outside the energy chain 10. The arrangement is set so that the light beam extends in the plane of movement and interacts with the narrow sides of the side flaps or the cross bars of the chain links (not shown in detail) of the energy chain 10. In this case, the external sensor 15 is aligned so that the deflection bend 13 is located in the beam path 17 of the optical sensor 15 at each position of the energy chain 10. In addition, the sensor 15 is arranged in FIG. 1 so that it is effective along the entire travel path of the energy chain 10 to be monitored.

The optical sensor 15 detects continuously, for example, continuously over time or with a sufficient frequency, for example, >100 Hz, preferably >500 Hz, the distance from the stationary sensor 15 to the deflection bend 13 and thus also the position of the deflection bend 13 of the energy chain 10. It is also possible to directly transmit the speed of the deflection bend 13 as the output of the sensor 15 to the evaluation unit 3 with an optical principle.

In normal operation, the deflection bend 13 moves at a speed which is half the constant speed of the entrainment member 4, except for acceleration and deceleration. When certain fault conditions of the energy chain 10 occur, for example, when a subregion of the movable strand 12 rears upwards (by way of example in FIG. 2B), a part of the energy chain 10 moves in a direction that deviates from the normal travel path or the desired nominal course in normal operation. In this case, the speed of the deflection bend 13 typically deviates from the speed in the normal course and is in particular lower than in normal operation. A corresponding deviation from the normal course based on a distance or speed measurement by the optical sensor 15 is thus also easy to discriminate on the temporal course of the position or speed of the deflection bend 13.

Such deviations from normal operation are detected in the embodiment according to FIG. 1 by the optical sensor 15 and are forwarded via signal to the separately executed modular evaluation unit 3 as output at the outlet 5 of the sensor 15. For this purpose, the evaluation unit 3 can be connected to the outlet 5 of the sensor via a signal line 6, for example, via a digital data interface such as a suitable field bus. Any suitable signal transmission is considered for this.

The evaluation unit 3 also continuously compares the values continuously detected or measured by the sensor 15 with a predetermined tolerance field or tolerance range which has been stored in the evaluation unit 3, for example, in a learning phase. When the evaluation unit 3 determines a critical discrepancy in this case, the evaluation unit 3 initiates a safety measure, in particular for the protection of the energy chain 10. For example, the evaluation unit 3 can emit a signal via a further signal line, for example, to the controller of the machine (not shown) supplied by the energy chain 10, in order to trigger an emergency stop of the movable machine part with which the entrainment member 4 is connected.

An evaluation unit 3, as shown schematically in FIG. 1, is also provided in the further embodiments according to FIG. 2 to FIG. 6, but not shown in detail for facilitation. An evaluation unit integrated into the sensor can be used instead of an external modular evaluation unit 3. As an alternative to an optical sensor 15, for example, an ultrasound-based sensor can also be used for distance measurement, since it does not depend on the absolute accuracy of the detection. This would be suitable, for example, with closed or tubular energy chains 10.

Figure 2A:
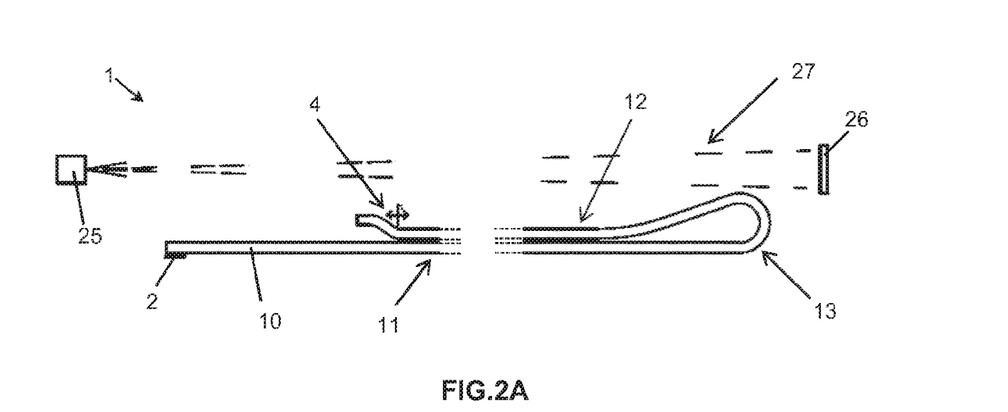
FIGS. 2A-2B are schematic diagrams, a second embodiment of the monitoring system according to the invention having light barrier in a side view, in normal operation (FIG. 2A) and in the case of a possible but rare fault condition (FIG. 2B)
Figure 2B:
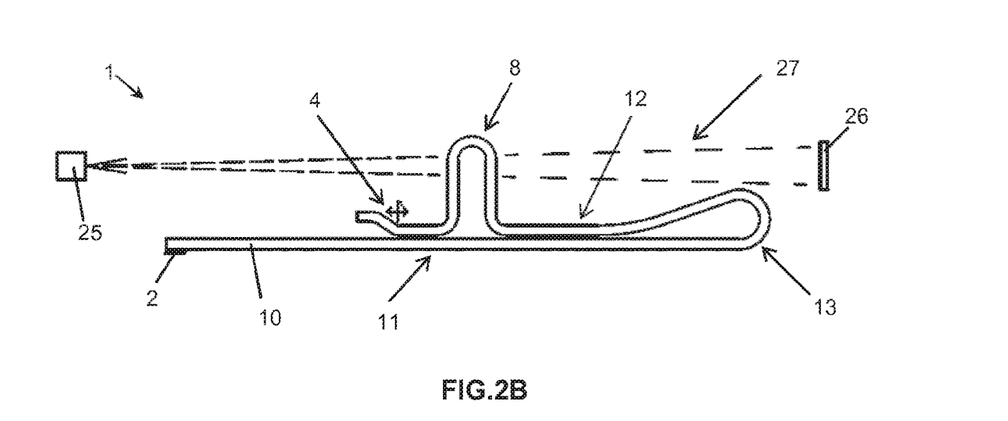

FIG. 2 shows another monitoring system 1 for the energy chain 10 having a sensor 25 which acts without contact but is not designed as a measuring device. In FIG. 2, the sensor 25 acts like a conventional photoelectric sensor. This sensor 25 is also optically detecting and generates a light barrier at a predetermined height above the entire energy chain 10 by means of the reflector 26. Sensor 25 with light source and sensor and the reflector 26 are aligned in a plane through which the travel path of the movable strand 12 extends. The beam path 27 of the light barrier in this case has a main axis parallel to the axis of movement of the entrainment member 4 and is vertically spaced from all regions of the energy chain 10 in normal operation, according to a predetermined threshold. When there is a malfunction of the energy chain 10, which typically occurs during the movement of the entrainment member 4 in the reverse direction, that is, thrust from the entrainment member 4 on the movable strand up to the deflection bend 13, a part of the movable strand 12, between the entrainment member 4 and the deflection bend 13, gets into the beam path 27 and interrupts the photocell. This interruption is detected by the sensor 25 and forwarded as output information to the evaluation unit 3 (FIG. 1). In this way, in FIG. 2, a subregion of the energy chain 10 only interacts with the sensor 25 when there is a fault condition.

Figure 3:
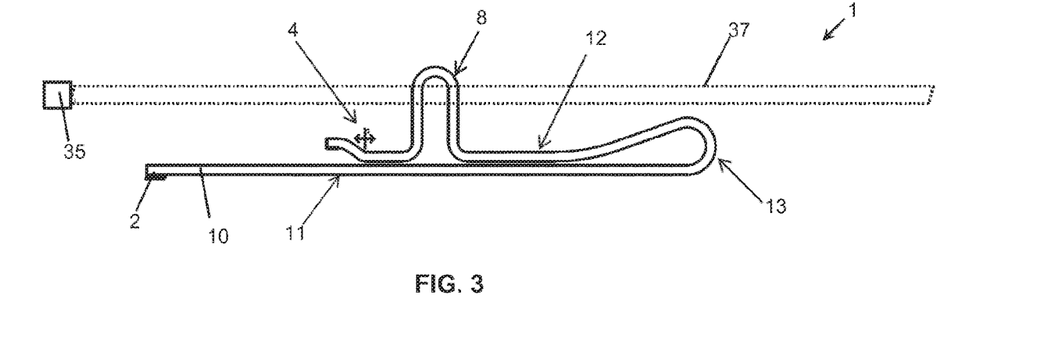
FIG. 3 is a schematic diagram, a third embodiment of the monitoring system according to the invention having an induction loop in a side view in the case of a possible fault condition.

As shown in FIG. 3, as an alternative to the principle of a light barrier, a sensor 35 can also operate without contact with an induction loop 37. The energy chain 10 in FIG. 3 comprises, for interaction with the induction loop 37, a ferromagnetic material at least at some points along the longitudinal direction. For example, energy chains 10 having links made of sheet steel links are inherently suitable for an induction loop 37, or links which are at least partially made of a ferromagnetic material, for example, with correspondingly used transverse or separating webs. As in FIG. 2, in FIG. 3, the energy chain 10 does not interact with the sensor 35 during normal operation. When there is a critical course of the movable strand 11 or of the deflection bend 13, a subregion can get into the free inner cross section of the induction loop 37 or approach it at least measurably. The deviation of the inductance thus generated is detected metrologically by the sensor 35 and a corresponding output value is transmitted to the evaluation unit 3 (FIG. 1).

Figure 4:
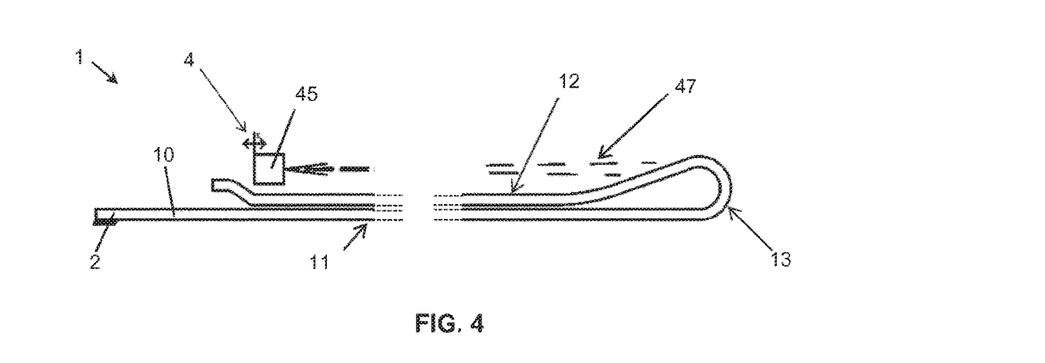
FIG. 4 is a schematic diagram, a fourth embodiment of the monitoring system according to the invention based on a distance measurement from the entrainment member to the deflection bend in a side view and in normal operation.

FIG. 4 shows a further embodiment of a monitoring system 1 according to the invention. Here, an optically detecting sensor 45, for example, of a similar design as in FIG. 1, is arranged on the entrainment member 4 in order to move therewith. The optical sensor 45 can be fastened, for example, to the movable machine part or to the end fastening member of the energy chain 10 which is fixedly attached thereto.

In FIG. 4, the sensor 45, for example, a laser distance measuring device or the like, is directed from the entrainment member 4 with its optical beam path 47 approximately parallel to the direction of travel on the deflection bend 13.

During normal operation of the energy chain 1, the sensor 45 thus measures the time-variable relative distance from the entrainment member 4 to the deflection bend 13, or directly the corresponding relative speed. The relative distance decreases steadily in normal operation when the entrainment member 4 moves in the forward direction and steadily increases in the reverse direction. In contrast, the relative speed in the stationary case is half the absolute speed of the entrainment member 4. When a fault condition occurs, the deflection bend shows a deviating behavior, or, for example, a subregion of the movable strand 12 can ascend into the beam path 47 of the sensor 45 from the entrainment member 4 to the deflection bend 13. In this case, the sensor 45 will measure a distance deviating from the target value, for example, as a recognizable jump, or an unusually strong deviating relative speed. This deviation is transmitted from the sensor 45 directly or, possibly, after data processing, to the evaluation unit 3 (FIG. 1). The evaluation unit itself can also detect a jump, for example, in moving average values formed continuously from the measured values. Both allow the recognition of almost all typical fault conditions with a simple arrangement. The embodiment according to FIG. 4 is particularly well suited when the controller of the machine or system is provided on the movable part itself.

Figure 5:
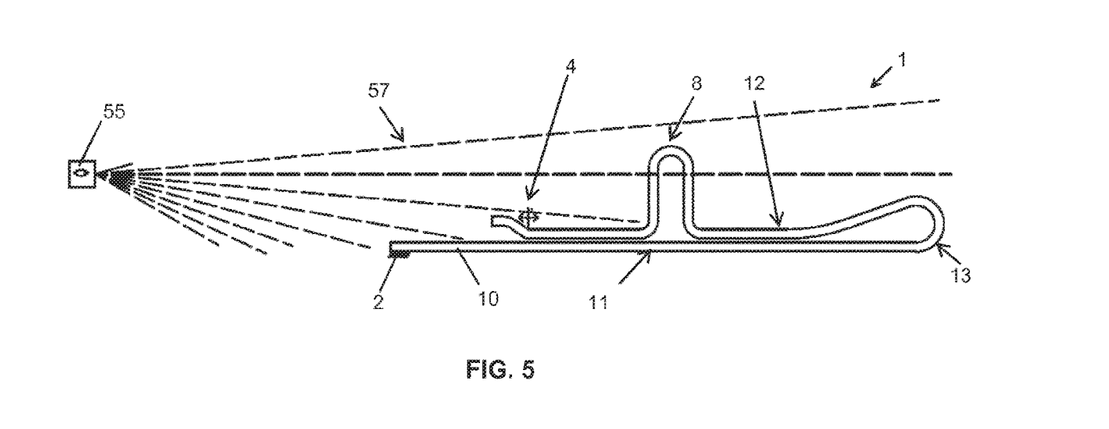
FIG. 5 is a schematic diagram, a fifth embodiment of the monitoring system according to the invention having a camera as a sensor in a side view, in the case of a schematically shown, rare fault condition.

In FIG. 5, a further monitoring system 1 is shown, wherein the sensor 55 is designed imaging, for example, as a digital video camera. The digital camera as sensor 55 is positioned so that it can detect the spatial arrangement virtually of the entire energy chain 10, in any case the movable strand 11 and the deflection bend 13, in all intended positions of normal operation. Thus, the image-generating sensor 55 can well detect any deviation and thus almost all possible fault conditions of the energy chain 10, in any case undesirable courses. Information about the spatial arrangement of the energy chain 10 is continuously forwarded from the sensor 55 to the evaluation unit 3 (FIG. 1). In the evaluation unit 3, there is a comparison by computational image processing with a predetermined tolerance field to detect any fault condition. The sensor 55 can also itself, for example, as a so-called vision sensor or smart camera, perform the image data processing wholly or partially, and possibly only transmit an information item about normal or faulty operation to the evaluation unit 3.

Figure 6:
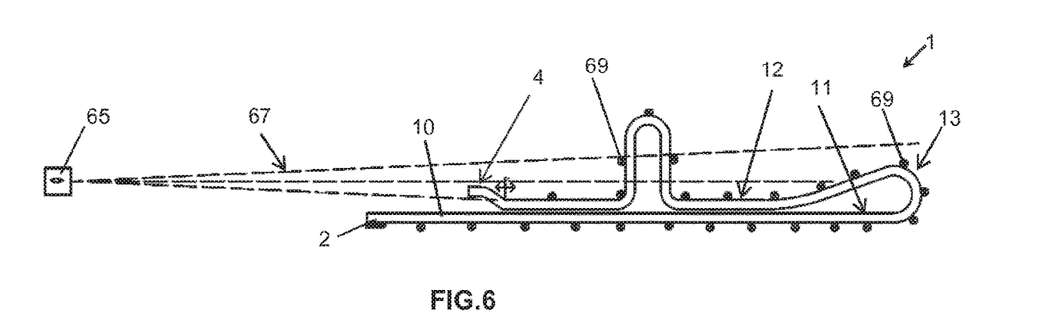
FIG. 6 is a schematic diagram, a sixth embodiment of the monitoring system according to the invention having a camera as a sensor and an energy chain marked with recognition features in a side view, in a rare fault condition shown schematically.

In the embodiment according to FIG. 6, the sensor 65 is designed in the manner of an optical scanner in order to interact with the energy chain 10 without contact. In FIG. 6, at least some points of the energy chain 10 are provided at regular distances, for example, at every n-th chain link, with optically distinguishable markings 69 as recognition features for the sensor 65. The markings 69 lie in the field of view 67 of the optical sensor 65 in order to be read from this. The markings 69 can be realized, for example, as barcode, color markings, high-contrast symbol sequence or the like. The markings 69 are provided in a predefined order along the length of the energy chain 10. According to FIG. 6, the sensor 65, for example, as a bar code scanner, is aligned with a relatively flat field of view 67 on the subregion that forms the entrainment member-side subregion of the deflection bend 13 during movement. The sensor 65 continuously scans the order of the markings that appear in the region of the deflection bend 13 in the field of view 67. At least the information as to whether an intended sequence of the markings 69 is detected is forwarded to the evaluation unit 3 (FIG. 1). The evaluation unit 3 itself can also receive the detected markings 69 from the sensor 65 and compare the sequence with a predetermined sequence, which is present in normal operation 1. If a fault condition of the energy chain 10 occurs, the markings 69 will not appear in the normal sequence in the field of view 67, but rather will not be detected correctly or in an incorrect sequence. As a result, many fault conditions are also easily recognized with less image processing effort compared to FIG. 5. A scanner-like sensor 65 according to FIG. 6 can also be installed together with recognition features, for example, in an arrangement similar to FIG. 4.

The solutions, in particular according to FIGS. 5 to 6, are also suitable for monitoring several energy chains. The various approaches for non-contact detection according to FIGS. 1-6 can also be combined with one another, for example, in order to increase detection reliability or to be able to better discriminate different fault conditions.

Figure 7:
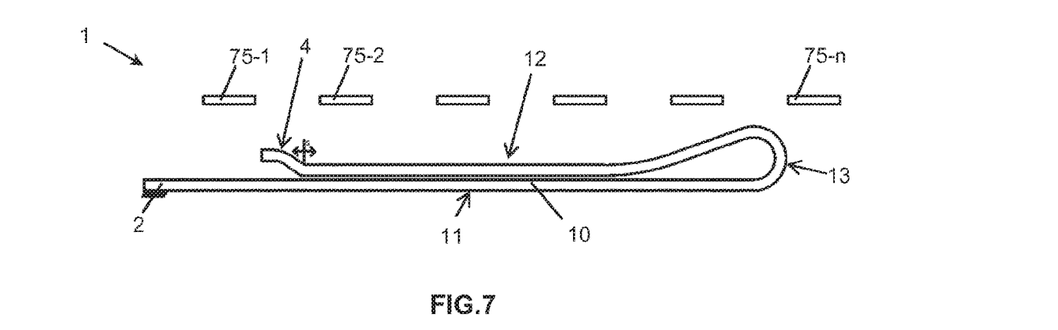
FIG. 7 is a schematic diagram, a seventh embodiment of the monitoring system according to the invention having multiple non-contact proximity detectors as sensors.

In the further embodiment according to FIG. 7, a number of non-contact sensors 75-1 to 74-n are arranged at a greater distance above the deflection bend 13 along the travel path. The sensors 75-1 to 75-n can be designed, for example, as metal detectors, capacitive proximity detectors or the like. In this case, the evaluation unit 3 can compare a vector of analog signal values of the sensors 75-1 to 75-n with a target vector. When there is an unexpected jump in a vector component beyond a threshold value, the evaluation unit 3 can conclude that the energy chain 1 has failed.

It can be seen from the embodiments described that the non-contact monitoring system according to the invention for the operation of an energy chain is built simple and is capable of reliably detecting a possible fault condition of the chain by its contactless detecting sensor and the evaluation unit to which the detected information is passed.

Already installed energy chains 10 can also be retrofitted with relatively little effort with one of the proposed sensors 15; 25; 35; 45; 55; 65; 75 in combination with a suitable electronic evaluation unit 3.

LIST OF REFERENCE CHARACTERS

FIGS. 1-6
1 monitoring system
2 fixed point
3 evaluation unit
4 entrainment member
5 outlet
6 signal line
8 fault condition
10 energy chain
11 stationary strand
12 moveable strand
13 deflection bend
15; 25; 35; 45; 55; 65; 75 sensor
26 reflector
17; 27; 47 beam path
37 induction loop
57; 67 field of view
69 marking

What is claimed is:
1. A monitoring system for operation of at least one energy chain for guiding at least one line between a first connection point on a base and a second connection point, relatively movable thereto, on an entrainment member, comprising:
the at least one energy chain which forms a movable strand, a stationary strand and a deflection bend therebetween;
at least one sensor to generate at least one output dependent on a condition of the energy chain;

an evaluation unit which evaluates the at least one output of the sensor, the evaluation unit to monitor whether a fault condition occurs during the operation of the energy chain; and the sensor which operates without contact and is arranged such that the sensor interacts from a distance with at least a subregion of the deflection bend and/or a subregion of the movable strand, to generate an output that is dependent on a position and/or a speed of the interacting subregion(s) of the energy chain, wherein the sensor is configured as a non-mechanically detecting sensor and comprises an optically detecting sensor, or the sensor is configured as a non-mechanically detecting sensor and comprises a distance meter.

2. The monitoring system according to claim 1, wherein the sensor is arranged such that a detection range of the sensor is aligned in a longitudinal direction of the energy chain.

3. The monitoring system according to claim 1, wherein the sensor is configured as the non-mechanically detecting sensor and comprises the distance meter.

4. The monitoring system according to claim 1, wherein the sensor is configured as an imaging sensor for digital image processing.

5. The monitoring system according to claim 1, wherein a series of recognition features is provided on the energy chain in a longitudinal direction, wherein the series of recognition features are optically detectable by the sensor from outside the energy chain.

6. The monitoring system according to claim 1, wherein the sensor detects a condition variable of the deflection bend.

7. The monitoring system according to claim 6, wherein the sensor detects a position and/or a speed of the deflection bend.

8. The monitoring system according to claim 1, wherein the sensor is arranged on the entrainment member or at the second connection point.

9. The monitoring system according to claim 1, wherein the system determines a relative speed or a speed ratio between the entrainment member and deflection bend and compares a value thus determined with a predetermined tolerance range.

10. The monitoring system according to claim 1, wherein the sensor is arranged stationary to detect a condition variable of the movable strand and/or of the deflection bend.

11. The monitoring system according to claim 10, wherein the sensor
is arranged above the energy chain and detects the position of at least a subregion of the movable strand and/or the deflection bend; or
is arranged essentially at a height of the deflection bend to detect the position and/or the speed of the deflection bend.

12. The monitoring system according to claim 10, wherein
the sensor is configured with a light barrier and interacts with a subregion only in a fault condition.

13. The monitoring system according to claim 1, wherein
the at least one energy chain comprises a plurality of energy chains and the sensor interacts with the plurality of energy chains; and/or
the at least one sensor comprises a plurality of sensors and the plurality of sensors interact with the energy chain.

14. The monitoring system according to claim 1, wherein the energy chain comprises a plurality of hingedly connected chain links and is movable back and forth in a plane of movement between two end positions.

15. The monitoring system according to claim 1, wherein
the monitoring system monitors the energy chain as to whether the fault condition occurs during the operation of the energy chain; and/or
the monitoring system determines a position of the deflection bend for monitoring the energy chain.

16. The monitoring system according to claim 1 wherein the sensor and the evaluation unit are retrofitted to the energy chain.

17. The monitoring system according to claim 1, wherein the evaluation unit compares with a predetermined tolerance range to monitor whether the fault condition occurs during the operation of the energy chain.

18. An arrangement for a monitoring system for operation of at least one energy chain, comprising:
the at least one energy chain for guiding at least one line between a first connection point on a base and a second connection point, relatively movable thereto, on an entrainment member, wherein the energy chain forms a movable strand, a stationary strand and a deflection bend therebetween;
at least one sensor to generate at least one output dependent on a condition of the energy chain;
wherein the sensor operates without contact and is arranged such that the sensor interacts from a distance with at least a subregion of the deflection bend and/or a subregion of the movable strand to generate an output that is dependent on a position and/or a speed of the interacting region(s) of the energy chain, wherein the sensor is arranged such that a detection range of the sensor is aligned in a longitudinal direction of the energy chain.

19. A monitoring system for operation of at least one energy chain for guiding at least one line between a first connection point on a base and a second connection point, relatively movable thereto, on an entrainment member, comprising:
the at least one energy chain which forms a movable strand, a stationary strand and a deflection bend therebetween;
at least one sensor to generate at least one output dependent on a condition of the energy chain;
an evaluation unit which evaluates the at least one output of the sensor, the evaluation unit to monitor whether a fault condition occurs during the operation of the energy chain; and
the sensor which operates without contact and is arranged such that the sensor interacts from a distance with at least a subregion of the deflection bend and/or a subregion of the movable strand, to generate an output that is dependent on a position and/or a speed of the interacting subregion(s) of the energy chain, wherein the sensor is arranged stationary to detect a condition variable of the movable strand and/or of the deflection bend, wherein the sensor is configured with an induction loop and interacts with a subregion only in a fault condition.

* * * * *